United States Patent [19]

Crahan et al.

[11] Patent Number: 4,917,544
[45] Date of Patent: Apr. 17, 1990

[54] METHODS AND APPARATUS FOR PNEUMATICALLY TRANSFERRING A FLOWABLE PRODUCT

[75] Inventors: Douglas Crahan; Steve Bendig, both of Birmingham, Ala.; Keith Toon, Wichita, Kans.

[73] Assignee: Vulcan Materials Company, Birmingham, Ala.

[21] Appl. No.: 13,532

[22] Filed: Feb. 11, 1987

[51] Int. Cl.[4] ............... B65G 53/66; B65G 53/40; B65G 53/12; B65G 53/36

[52] U.S. Cl. .......................... 406/14; 406/119; 406/146; 406/122

[58] Field of Search ............... 406/146, 119, 14, 197, 406/192, 127, 122, 108, 11

[56] References Cited

U.S. PATENT DOCUMENTS 3,007,744 11/1961 Ward et al. ............... 406/146
3,180,689 4/1965 Albert ....................... 406/119
3,365,242 1/1968 Marchetti ................. 406/14

Primary Examiner—Joseph F. Peters, Jr.
Assistant Examiner—James M. Kannofsky
Attorney, Agent, or Firm—Burns, Doane, Swecker & Mathis

[57] ABSTRACT

Caustic soda beads are transferred from a railcar to a receiving zone by means of an open loop air circuit. Ambient air is compressed in the circuit to a pressure of at least 75 psig in a compressor which simultaneously demoisturizes the air. Thereafter, the air is delivered to a dryer to be further demoisturized. The demoisturized, pressurized air is passed through a pressure reducing valve such that the air pressure is reduced to below 25 psig. A first portion of the low pressure air is conducted to the interior of the railcar. A second portion of the demoisturized, low pressure air is conducted through a control valve and then past an outlet of the railcar to cause caustic soda beads to become entrained therein and conducted to the receiving zone. The control valve is automatically adjusted in accordance with the pressure in the railcar to regulate the amount of pressurized air supplied to the railcar in order to maintain a constant pressure within the railcar.

8 Claims, 3 Drawing Sheets

METHODS AND APPARATUS FOR PNEUMATICALLY TRANSFERRING A FLOWABLE PRODUCT

BACKGROUND OF THE INVENTION

The present invention relates to methods and apparatus for pneumatically transferring a flowable product from one location to another, such as transferring caustic soda beads from a railcar to a storage container.

A product such as caustic soda beads is typically transported in containers such as railcars and is transferred from the railcars by means of air streams in which the beads become entrained. It is necessary that the air streams be dry because caustic soda beads are very hygroscopic and will absorb moisture present in the air. When moisture is absorbed, a hydrate is formed on the surfaces of the beads, tending to bind the beads together into lumps which become harder as more moisture is absorbed. As a result, the beads become more difficult to transfer and are in a less desirable condition after being transferred.

One conventional unloading apparatus, depicted schematically in FIG. 3, comprises a closed-loop pneumatic circuit 1A in which pressurized air is continuously recirculated. The circuit communicates with railcar outlets 2A to draw the beads from the railcar 3A and into the air which is normally pressurized by a compressor 4A to around 15 psig. The beads become entrained in the air and are transported to a receiving silo 5A. Makeup air is introduced from a branch conduit 6A which includes a dryer 7A for demoisturizing the make-up air. A portion of the pressurized air is fed into the railcar via conduit 8A to promote discharge of the beads into the circuit 1A. Among the shortcomings of such a system is the possibility for air leaks to develop in the closed-loop circuit permitting the entry of moisture into the circulated air. As noted earlier, the presence of moisture adversely affects the ability of the air to properly transport the beads.

Furthermore, a closed-loop system conducts relatively large amounts of dust particles which must be filtered out upstream of the compressor 4A to avoid the occurrence of damage thereto. This requires that large dust filters be provided which must be cleaned or replaced on a regular basis. Otherwise, the filter surfaces can become clogged to such an extent that they will break, allowing dust particles to enter and damage the compressor.

Another known system for transporting caustic soda beads, depicted schematically in FIG. 4, employs an open loop pneumatic circuit 1B wherein ambient air is drawn through a dryer 7B by a compressor 4B which pressurizes the air to about 15 psig. A portion of the pressurized air is conducted into the railcar 3B via conduit 8B to promote exiting of the beds into the circuit 1B. After conducting the beads to the receiving zone 5B, the pressurized air is discharged to atmosphere. However, such a system requires the use of a very large, costly dryer 7B in order to properly demoisturize the air, especially during summer periods of high ambient humidity.

Another shortcoming which is characteristic of both prior art systems disclosed in connection with FIGS. 3 and 4 involves an occasional clogging of the circuit 1A, 1B by the beads as the beads tend to adhere to one another. This requires a manual opening and cleaning of the conduit which is quite burdensome and time-consuming.

A further shortcoming stems from the fact that the flow characteristics of a product such as caustic soda beads are not always consistent. Therefore, the air flow conducted to the railcar in FIGS. 3 and 4 may have to be adjusted from time to time to maintain a proper flow. This adjustment is made manually and is thus burdensome on the operating personnel, and the exact adjustment which needs to be made is not known, hence the efficiency of such a system is rarely at an optimum level during periods of higher humidity.

It has been known to demoisturize air within chemical plants by compressing ambient air to relatively high pressure, e.g., 100 psig, in a conventional compressor, whereupon a considerable amount of the moisture condenses during the pressurizing step and was drained-off. The partially demoisturized air was then further demoisturized by the use of a conventional air dryer. Dried air was withdrawn from the building to pneumatically convey caustic soda beads from railcars.

It is an object of the present invention to provide novel methods and apparatus for pneumatically transferring a product in the absence of the above-described shortcomings.

SUMMARY OF THE INVENTION

The present invention relates to methods and apparatus for transferring a flowable product from a container having an outlet opening, to a product-receiving zone. The method comprises the steps of providing an open-loop air circuit which communicates the outlet opening with the product receiving zone by means of a transfer conduit. Ambient air is pressurized to at least 75 psig in a compressor which condenses moisture from the air as it pressurizes therein. The pressurized, partially demoisturized air is conducted from the compressor through a dryer to further demoisturize the air. The air pressure is then reduced to below 25 psig. A first portion of the demoisturized, reduced-pressure air is conducted to the container to pressurize the container. A second portion of the demoisturized, reduced-pressure air is conducted through an automatic control valve and into the transfer conduit and past the discharge opening to cause product to become entrained in the air. The pressure in the container is continually sensed, and a signal indicative of the sensed pressure is generated. That signal is supplied to a control system which is connected to the control valve for automatically opening and closing the control valve in accordance with that signal to vary the amount of the first air portion delivered to the container and thereby maintain a predetermined pressure therein. The pressurized air and entrained product in the transfer conduit are conducted to the receiving zone. Thereafter, the pressurized air is discharged to atmosphere.

Preferably, the air pressure is reduced by passing the air through a pressure reducing valve which can be selectively opened to subject the transfer conduit to high pressure air for dislodging blockages therein.

Preferably, the control system comprises a pneumatic control system which is operated by pressurized air withdrawn from the circuit prior to the step of reducing the air pressure.

The present invention also involves an apparatus for producing the above-described functions.

BRIEF DESCRIPTION OF THE DRAWING

The objects and advantages of the invention will become apparent from the following description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
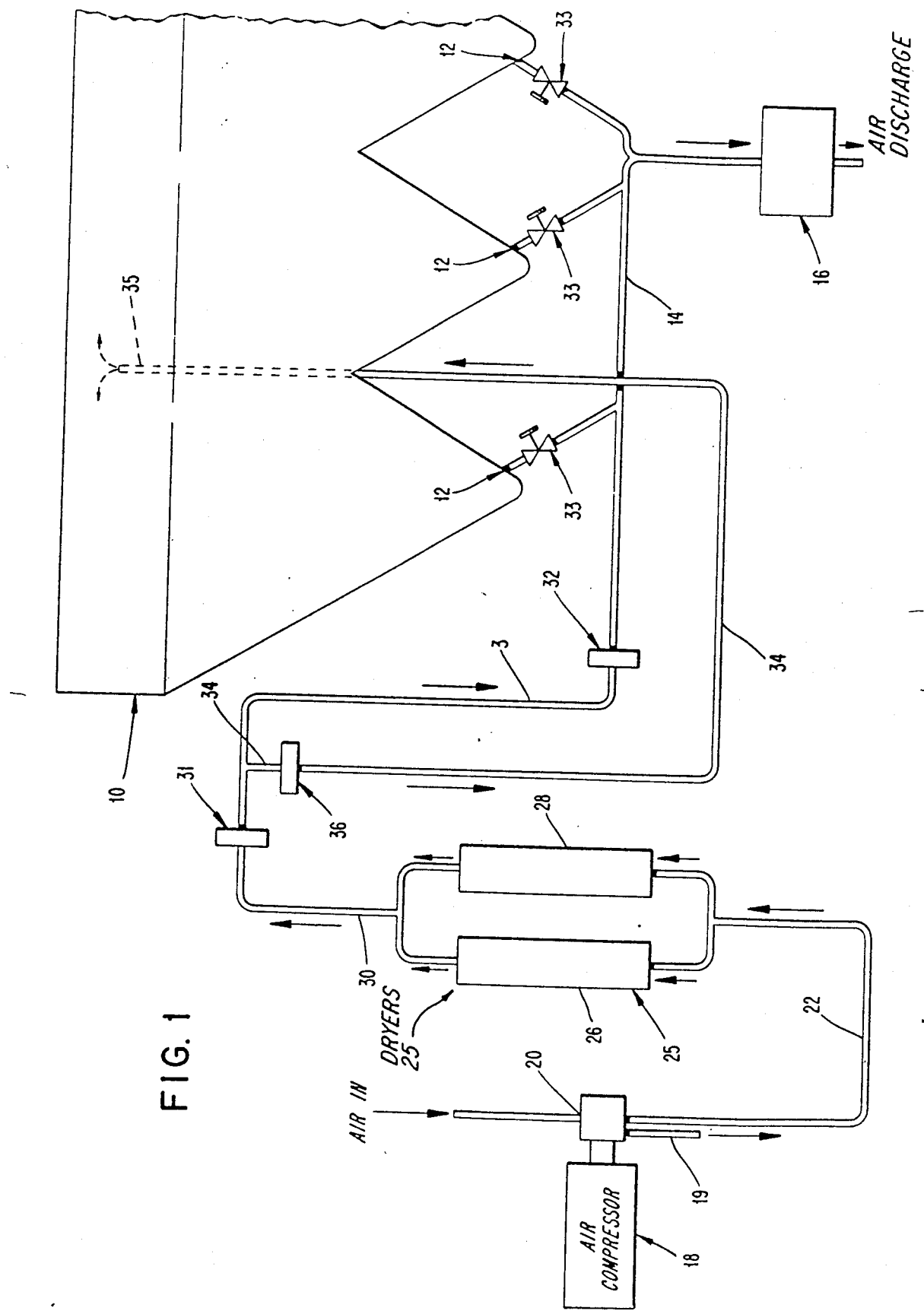
FIG. 1 is a schematic view of an open loop air circuit according to the present invention for transferring caustic soda beads from a railcar to a receiving zone.

Depicted schematically in FIG. 1 is a container such as a railcar 10 which contains a flowable product such as caustic soda beads. The railcar 10 includes a plurality of discharge outlets 12 spaced along its bottom.

Communicating with those outlets is an open-loop air circuit which includes a transfer conduit 14 adapted to conduct a flow of pressurized air to transfer beads from the railcar to a receiving zone 16 such as a silo. The air is pressurized by a conventional air compressor 18 which takes-in ambient air via inlet 20 and discharges the air into a discharge line 22 at an elevated pressure greater than 75 psig, preferably about 100 psig, for example. Due to the high extent to which the ambient air is pressurized, a substantial amount of moisture is condensed within the compressor and is discharged through a drain 19.

The pressurized air is fed to a downstream dryer arrangement 25 in the form of dual towers 26, 28 connected in parallel with the air discharge line 22. The dryer arrangement comprises a dual tower system in which one tower is regenerated while the other is in use. A mechanism automatically institutes the regeneration stage for each tower and places the other in communication with the discharge line. The regeneration can be accomplished by a small stream of dry air from the active tower, or by a separate heater. Alumina is preferably utilized in the tower as a dessicant. Dryers of this type are available from Zurn Industries, Inc., for example.

Dry pressurized air exits the dryer and travels through a feed line 30 to a conventional pressure-reducing valve 31 in which the pressure is reduced to a value of about 15 psig. The demoisturized, reduced-pressure air travels to an automatically operated control valve 32. During the transfer of caustic soda beads in a low humidity environment, the control valve 32 is held fully open, so that the full air flow is delivered to the transfer conduit 14. When the transfer conduit 14 communicates with the railcar outlets 12 by means of valved conduits 33, the caustic soda beads become entrained in the pressurized air flow and are conveyed to the receiving zone 16. The pressurized air is discharged to atmosphere after the beads have been deposited at the receiving zone.

During periods of higher ambient humidity and/or temperatures, wherein the exiting of beads from the railcar may be hindered to some extent, some of the pressurized air is diverted into the railcar to promote the exit of the beads through the outlet opening 12. This is achieved by means of a container feed conduit 34 which communicates with the feed line 30 upstream of the automatic control valve 32 and includes an outlet 35 disposed at an upper end of the interior of the railcar. Disposed in the container feed conduit 34 is a shut-off valve 36 which can be closed during low humidity periods. By opening the valve 36 and partially closing the control valve 32, some of the pressurized air is fed into the railcar.

It is desirable that the air pressure within the railcar be maintained as uniformly as possible in order to achieve a constant rate of conveyance of the beads. In practice, however, the pressure within the railcar will tend to vary, in the absence of pressure adjustment, because the physical characteristics of the caustic soda beads vary among the beads, whereby the beads exhibit variable flow characteristics. When the beads become less free-flowing, the air pressure within the railcar becomes reduced, because the rate of air flow through the outlet openings 12 becomes greater as a consequence of reduced bead flow. On the other hand, if the beads thereafter become more free-flowing, the internal pressure will increase, because less air is able to exit the railcar.

Figure 2:
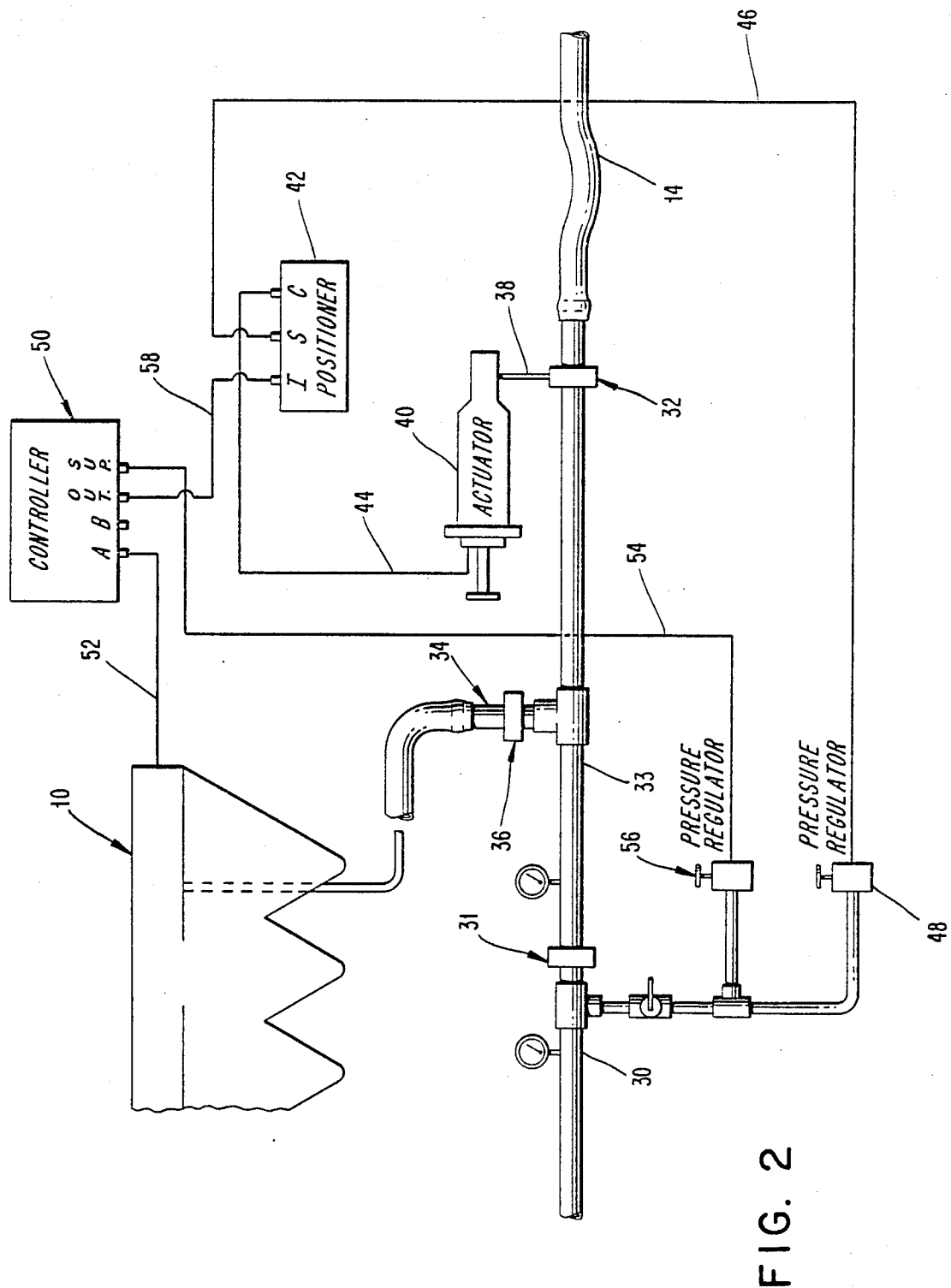
FIG. 2 is a schematic view of an automatic control system utilized in the open loop circuit of FIG. 1.

An automatic valving arrangement is provided which automatically adjusts the control valve 32 to maintain a substantially constant pressure within the railcar. In that arrangement, depicted in FIG. 2, the control valve 32 comprises a valve capable of being automatically opened and closed. For example, a conventional 3" butterfly valve made by Keystone Valve Co. of Houston, TX can be utilized which includes an activator stem 38. An actuator 40 is operably connected to the activator stem 38 to rotate the latter to various (i.e., infinite) positions of adjustment. A conventional pneumatic actuator, marketed by the Jamesbury Co. of Worcester, MA under the designation C-60 Quadra-power with manual override, is suitable. The actuator 40 is driven by pressurized air supplied from a conventional pneumatic positioner 42 via conduit 44, to control the position of the actuator 40 and thus of the butterfly valve 32. A conventional pneumatic positioner 44 marketed by the Bettis Co. of Houston, TX under the designation PMV 1200 Positioner may be used. The pressurized air delivered to the actuator 40 is received from a conduit 46 which communicates with the feed line 30 upstream of the pressure reduction valve 31. The air pressure level in the conduit 46 is adjustably controlled by a conventional pressure regulator 48.

Actuation of the positioner 42 to conduit pressurized air to the actuator 40 to adjust the valve is initiated by a controller 50. The controller 50 communicates with the interior of the railcar 10 via a pressure line 52 which provides the controller 50 with a signal indicative of the pressure level inside the railcar. The controller 50 is pre-set to send a pneumatic signal to the positioner 42 whenever that sensed pressure level exceeds or falls below predetermined reference pressure value at which the controller is preset. Pressurized air is supplied to the controller by means of a conduit 54 which communicates with the feed line 30 upstream of the pressure reduction valve 31. The pressure level in the conduit 54 is regulated by a conventional pressure regulator 56. The controller 50 reduces the air pressure and supplies the lower pressure air to the positioner 42 via conduit 58 to actuate the positioner. A conventional pneumatic controller 50 marketed by Fisher Controls of Marshalltown, IA under the designation 4195B Controller has been found suitable.

It will be appreciated that when a railcar is being unloaded in a humid and/or hot environment, the valve 36 is manually opened to conduct pressurized air from the feed line 30 to the railcar interior, and the control valve 32 is placed under the control of the controller 50 which senses the air pressure in the railcar 10 via the conduit 52. The controller 50 is set to maintain a specified pressure within the railcar. In the event that the rate of bead flow is reduced, the resulting drop of air pressure within the railcar is sensed by the controller 50. When the dropping pressure falls below the value to which the controller 50 has been set, the controller 50 sends a pneumatic signal to the positioner 42 via conduit 58, causing the positioner to supply pressurized air to the actuator 40 via conduit 44. The actuator 40 thus begins closing the control valve 32, whereupon a greater amount of pressurized air in the feed line 30 is diverted to the railcar interior via conduit 34. The resulting pressure rise in the railcar interior increases the rate of bead discharge. This, in turn, produces an increase in the pressure level within the railcar. When that increasing pressure reaches the value pre-set in the controller 50, activation of the control valve 32 is terminated.

Conversely, if the rate of bead discharge is such as to cause the pressure within the railcar to rise above the pre-set value of the controller, the control valve 32 will be opened to reduce the air flow to the railcar interior until the pre-set pressure level is reattained.

As noted earlier herein, it is not uncommon for beads to tend to clump together while being fed in the transfer conduit. Such a clumping can produce blockages requiring that the conduits be disassembled and cleaned. This problem can be effectively dealt with in the presently claimed invention by manually opening the pressure reduction valve 31 and thereby subjecting the transfer conduit 14 to higher pressure air e.g., up to about 75 psig or higher. That high pressure air should easily dislodge most flow blockages which may occur.

Figure 3:
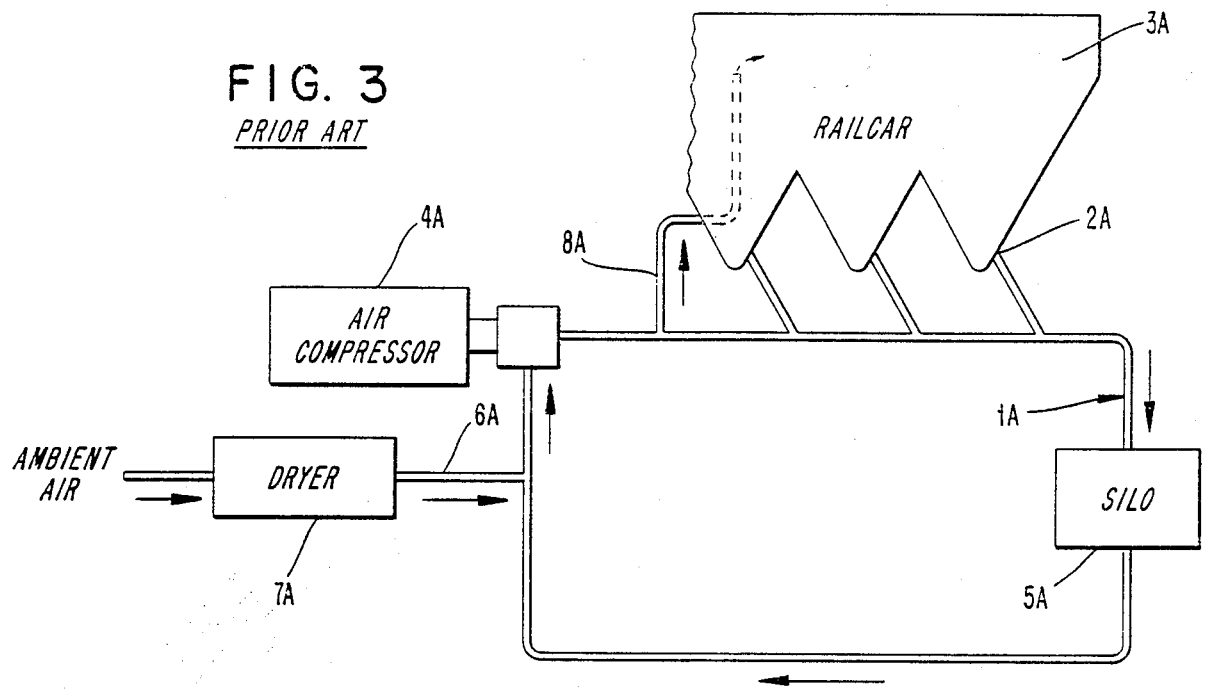
FIG. 3 is a schematic view of a prior art system for transferring caustic soda beads from a railcar to a receiving zone.
Figure 4:
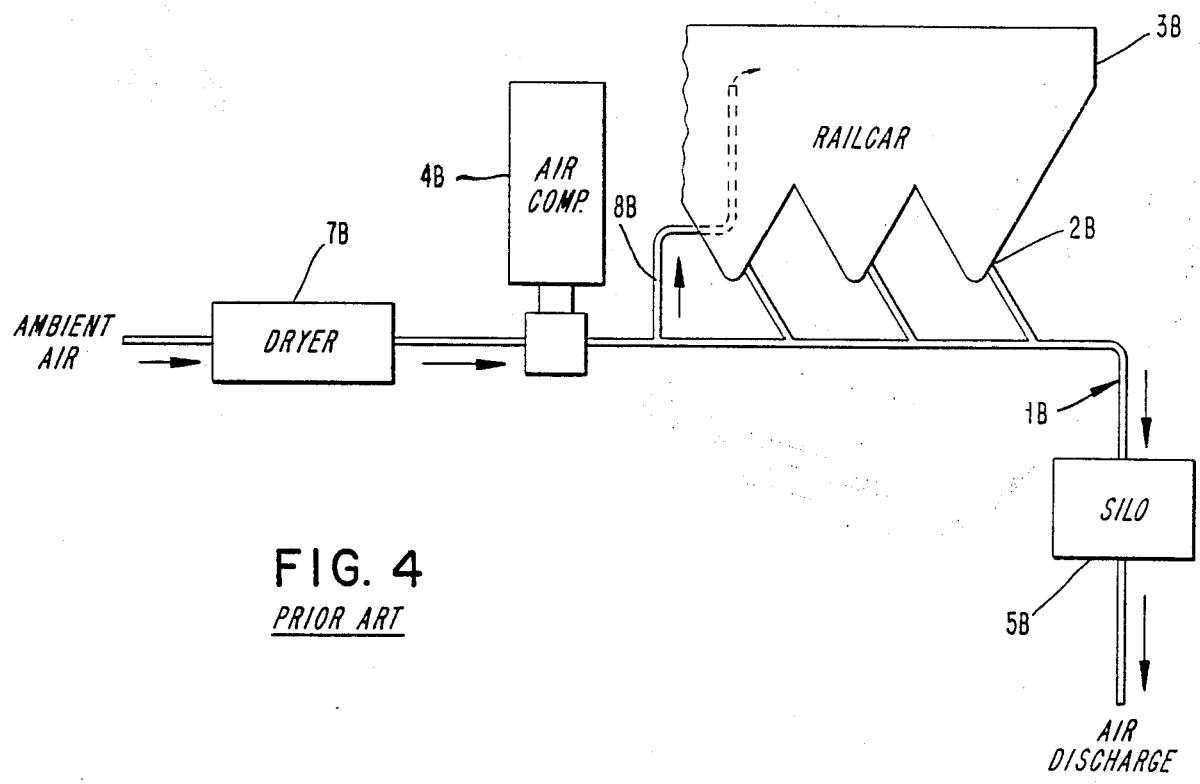
FIG. 4 is a schematic view of a prior art open loop air circuit for transferring caustic soda beads from a railcar to a receiving zone.

It will be appreciated that the present invention provides, at relatively low cost, a very effective and reliable transfer system. That is, by employing an open loop arrangement with dryers disposed downstream of the compressor, it is assured that the moisture content of the transport air will be held to acceptably low levels. There is less chance for moist air to inadvertently enter the transfer air stream than in closed-loop circuits of the type described earlier in connection with FIG. 3.

Furthermore, by initially pressurizing the air to a high level, e.g., at least 75 psig, a substantial amount of the moisture in the incoming ambient air condenses within the compressor itself and is drained away. Hence, relatively small dryers can be used and placed in the main air line downstream of the compressor to assure that all air from the compressor is demoisturized.

In addition, blockages in the transfer conduit 14 can be easily dislodged by opening the valve 31 to subject the blockage to full air pressure.

Significantly, the pressure within the railcar is automatically maintained at a substantially constant level by the automatic control system, eliminating the need for manual regulation of that pressure. The burden on the operating personnel is thereby reduced, and a greater precision in the pressure regulation is achieved.

Although the present invention has been described in connection with a preferred embodiment thereof, it will be appreciated by those skilled in the art that modifications, substitutions, additions and deletions not specifically described may be made without departing from the spirit and scope of the invention as defined in the appended claims.

What is claimed is:

1. A method of transferring a flowable product from a container having an outlet opening, to a product-receiving zone, said method comprising the steps of:
   providing an open-loop air circuit which communicates said outlet opening with said product-receiving zone by means of a transfer conduit,
   pressurizing ambient air to at least 75 psig in a compressor while condensing moisture from the air as it is being pressurized,
   conducting pressurized, partially demoisturized air from said compressor through a dryer to further demoisturize the air,
   reducing the pressure of said pressurized, demoisturized air to below 25 psig,
   conducting a first portion of said demoisturized, reduced-pressure air into said container to pressurize said container,
   conducting a second portion of said demoisturized, reduced-pressure air through an automatic control valve and into said transfer conduit and past said discharge opening to cause product to become entrained in said air,
   continually sensing the pressure in said container and generating a signal indicative of the sensed pressure,
   supplying said signal to a control system connected to said control valve for automatically opening and closing said control valve in accordance with said signal to vary the amount of said first air portion delivered to said container to maintain a predetermined pressure therein,
   conducting the pressurized air and entrained product in said transfer conduit to said receiving zone, and thereafter
   discharging said pressurized air to atmosphere.

2. A method according to claim 1, wherein said step of reducing the pressure of said air to below 25 psig comprises passing said air through a pressure reducing valve which can be selectively opened to subject said transfer conduit to higher pressure air for dislodging blockages therein.

3. A method according to claim 1, wherein said supplying step comprises supplying said signal to a pneumatic control system, said pneumatic control system operated by pressurized air withdrawn from said circuit before said step of reducing said air pressure.

4. A method of transferring caustic soda beads from a railcar having an outlet opening, to a receiving zone, said method comprising the steps of:
   providing an open-loop air circuit which communicates said outlet opening with said receiving zone by means of a transfer conduit,
   pressurizing ambient air to at least 75 psig in a compressor while condensing moisture from the air as it is being pressurized,
   conducting pressurized, partially demoisturized air from said compressor through a dryer to further demoisturize the air,
   reducing the pressure of said pressurized, demoisturized air to below 25 psig, conducting a first portion of said demoisturized reduced-pressure air into said railcar to pressurize said railcar, conducting a second portion of said demoisturized, reduced-pressure air through an automatic control valve and into said transfer conduit and past said discharge opening to cause caustic soda beads to become entrained in said air, continually sensing the pressure in said railcar and generating a signal indicative of the sensed pressure, supplying said signal to a pneumatic control system connected to said control valve for automatically opening and closing said control valve in accordance with said signal to vary the amount of said first air portion delivered to said railcar to maintain a predetermined pressure therein, said pneumatic control system operated by pressurized air withdrawn from said circuit ahead of said step of reducing said air pressure, conducting the pressurized air and entrained caustic soda beads in said transfer conduit to said receiving zone, and thereafter discharging said pressurized air to atmosphere.

5. Apparatus for transferring a flowable product from a container having an outlet opening, to a product-receiving zone, comprising:

an open-loop air circuit including a transfer conduit communicating said outlet opening with a product-receiving zone, compressor means in said circuit for pressurizing ambient air to at least 75 psig while removing moisture from such air during the pressurization thereof, dryer means communicating with an outlet of said compressor means for receiving pressurized, partially demoisturized air therefrom and further demoisturizing said air, pressure reducing means communicating with an outlet of said dryer means for reducing the pressure of air from said dryer means to below 25 psig, conduit means downstream of said pressure reducing means for feeding a first portion of pressurized air received from said pressure reducing means into said container for pressurizing said container, an automatic control valve arranged to admit a second portion of said pressurized air from said dryer means which by-passes said conduit means, said control valve communicating with said transfer conduit such that said second portion of pressurized air enters said transfer conduit and travels past said discharge opening to cause product to become entrained in said second portion of pressurized air for conveyance to said receiving zone, means for continually sensing the pressure in said container and generating a signal indicative of the sensed pressure, a control means operatively connected to said sensing means and to said control valve for automatically opening and closing said control valve in accordance with said signal to vary the amount of air delivered to said container to maintain a predetermined pressure therein, said transfer conduit communicating with said product-receiving zone for transferring the air-entrained product to said zone and thereafter discharging the pressurized air to atmosphere.

6. Apparatus according to claim 5, wherein said pressure reducing means comprises a pressure reducing valve which is operable to subject said transfer conduit to higher pressure air for dislodging blockages therein.

7. Apparatus according to claim 5, wherein said control means comprises a pneumatically-actuated control mechanism, and conduit means for withdrawing pressurized air from said circuit upstream of said pressure-reducing means and delivering such withdrawn pressurized air to said control mechanism.

8. Apparatus according to claim 5, wherein said container comprises a railcar.

* * * * *